United States Patent Office 3,278,637
Patented Oct. 11, 1966

3,278,637
POLYOXYALKYLATED ALKYL PHENOL-FORMAL-
DEHYDE-ALKYLENE POLYAMINE RESINS
Willard H. Kirkpatrick, Sugar Land, and Virgil L. Seale,
Houston, Tex., assignors to Nalco Chemical Company,
a corporation of Delaware
No Drawing. Original application Oct. 28, 1960, Ser. No.
65,564, now Patent No. 3,166,516, dated Jan. 19, 1965.
Divided and this application Sept. 4, 1964, Ser. No.
394,594
8 Claims. (Cl. 260—838)

This application is a division of our copending application Serial No. 65,564, filed October 28, 1960, now U.S. Patent No. 3,166,516 which in turn is a continuation-in-part of our now abandoned application Serial No. 635,579, filed January 23, 1957.

This application relates to new and useful polyoxyalkylated resins having surface-active properties. The polyoxyalkylated resins are useful in the treatment of emulsions of mineral oil and water, especially water-in-oil emulsions, for the purpose of breaking the emulsions and separating the oil and water.

The compositions of the invention may be used to treat emulsions such as petroleum emulsions commonly encountered in the production, handling and refining of crude mineral oil, for the purpose of separating the oil from the water. Also, the compositions may be used in the treatment of other water-in-oil type of emulsions wherein the emulsions are produced artificially or naturally and the resolution of the emulsions presents a problem of recovery or disposal. A particularly important aspect of the invention is concerned with the beneficial properties of the compositions of the invention in desalting.

Petroleum emulsions are, in general, of the water-in-oil type wherein the oil acts as a continuous phase for the dispersal of finely-divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a deemulsifying agent of the kind hereinafter described, thereby causing the emulsion to resolve and stratify into its component parts of oil and water or brine after the emulsion has been allowed to stand in a relatively quiescent state.

Still another type of process involves the use of a deemulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A deemulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

In desalting operations where petroleum emulsions are created artificially and then broken, the conditions employed are usually quite different from those used in breaking water-in-oil petroleum emulsions at the well. The temperature may range from 160° F. to 350° F. and are preferably around 190° F. to 210° F. The pressures are those which are developed by heating under autogenous pressures and may be, for example 215 to 250 pounds per square inch gauge. The time of heating is subject to variation but is usually around 15 to 30 minutes. Since a refinery unit may handle up to 50,000 barrels of oil per day and the amount of salt present may be, for example, 15 pounds to 250 pounds of salt per thousand barrels of oil, it will be appreciated that the separation of this salt is very important, especially since it is usually desired to reduce the salt content of the oil by at least 90%.

One of the objects of the present invention is to provide new and useful compositions of matter which are water-wettable, interfacial and surface-active in order to enable their use as deemulsifiers or for such uses where surface-active characteristics are necessary or desirable.

Another object is to provide surface-active, polyoxyalkylated resins useful is resolving petroleum oil emulsions, especially water-in-oil emulsions.

An additional object of the invention is to provide surface-active, polyoxyalkylated resins especially useful for desalting petroleum oils. Other objects will appear hereinafter.

In accordance with the invention, the crude oil deemulsifying agents are oxylakylated condensation products obtained by reacting phenols which are primarily difunctional, alkyl phenols, the alkyl groups having an average of 4–15 carbons, formaldehyde, and alkylene polyamides. Ortho, ortho- or para, ortho-dialkyl phenols are not suitable for compositions of this invention, but amounts up to 25% of said dialkyl phenols in the difunctional, alkyl phenol reactant may be tolerated. Dialkyl phenols with one alkyl group in the ortho- or para-position and one alkyl group in the meta-position are difunctional phenols for the purposes of this invention. The term "difunctional phenol" relates to the methylol-forming reactivity of the phenol with formaldehyde.

The preferred alkylene polyamines are those having two primary amino groups, e.g., ethylene diamine, propylene diamine, hexamethylene diamine, diethylene triamine, triethylene tetramine, tetraethylene pentamine, higher polyalkylene polyamine homologs thereof up to about 10 amino groups per molecule, mixtures thereof, and the corresponding 1,2- and 1,3-polypropylene polyamines.

The preferred phenols used in the condensate polymers are monoalkyl phenols having the alkyl group in the functional positions of the phenolic ring upon which methylol groups form in the reaction with formaldehyde, i.e., the ortho- or para-positions. The alkyl groups in the phenolic substituent may be the same or they may be different, as when a mixture of alkyl phenols is the phenolic reactant. The average number of carbons in the alkyl groups of the phenolic reactant should be in the range of about 4–15. Alkyl groups of 4–9 carbons are preferred.

Examples of such phenols are o-butyl phenol, o-isobutyl phenol, p-n-butyl phenol, p-isobutyl phenol, p-tert. butyl phenol, o-amyl phenol, p-amyl phenol, p-tert. amyl phenol, o-octyl phenol, p-octyl phenol, o-nonyl phenol, p-nonyl phenol, o-dodecyl phenol, p-dodecyl phenol, mixtures of o-phenols and p-alkyl phenols, mixtures of ortho or para alkyl phenols with up to 25% o-, p-dialkyl phenols with 4–15 carbons in the alkyl groups such as the commercially available mixture of about 90% p-nonyl phenol with about 10% o-, p-dinonyl phenol, and mixtures of difunctional monoalkyl phenols whose alkyl groups average at least about 4 carbons and not more than about 15 carbons, e.g., mixtures of p-octyl phenol and p-nonyl phenol, a mixture of about 30% p-isopropyl phenol and 70% p-octyl phenol, and the like.

The oxyalkylating agents are lower alkylene oxides, e.g., ethylene oxide, 1,2-propylene oxide, or mixtures of ethylene oxide and 1,2-propylene oxide and the weight ratio of the alkylene oxide to the phenol-formaldehyde-polyamine condensation product will, for most applications, fall between about 2:3 and 10:1, or even higher, respectively. The phenol-formaldehyde-polyamine condensation products contain about 4 to 15 phenolic nuclei per resin molecule.

Where both ethylene oxide and propylene oxide are used to oxyalkylate the condensation product, they may be reacted as a mixture or the oxide may be added sequentially—e.g., the propylene oxide being added to the resin first and the ethylene oxide being added to the oxypropylene-1,2 groups. In the latter case, the terminal oxyalkylate groups are those of oxyethylene, which have primary hydroxyl groups. Simultaneous reaction of a mixture of the oxides probably gives an oxyalkylated product having both types of terminal hydroxy groups, —CH₂CH₂OH and

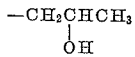

Phenol-formaldehyde-polyamine condensation

The phenol-formaldehyde-alkylene polyamine condensation products are prepared by reacting formaldehyde or a substance which breaks down to formaldehyde under reaction conditions, e.g., paraformaldehyde or trioxane, the difunctional alkyl phenol, often preferably a crude mixture of alkylated phenols for economic reasons, and the alkylene polyamine by heating the reactants in the presence of a small amount of an alkaline catalyst such as sodium hydroxide under the reaction temperatures and conditions causing the elimination of water of reaction. The condensates are phenolic and alkylene polyamine residues connected by methylene bridges. In some cases, the polyamine itself serves as the alkaline catalyst.

The condensation reaction preferably is carried out under substantially anhydrous conditions—excepting the water produced during the reaction. The aqueous distillate which begins to form when the reactants are heated is collected and removed from the reaction mixture.

The phenol-formaldehyde-polyamine condensation product may be prepared by agitating and heating a mixture of the three reactants. In this case, the presence of the polyamine provides sufficient alkalinity for the condensation reaction. Alternatively, the alkyl phenol and formaldehyde may be only partially condensed—e.g., by heating these reactants above for a shorter period of time than necessary to obtain complete condensation and leaving in the reaction mixture some unreacted phenol and formaldehyde. The reaction mixture is then cooled somewhat, and the alkylene polyamine is added to the reaction mixture. Heat is again applied to remove the water of reaction. Heating is continued until the amount of aqueous distillate collected indicates that the condensation is complete. Alternatively, the alkyl phenol may be precondensed with a portion of the formaldehyde in the form of precursor phenol-formaldehyde intermediate condensate. The intermediate condensate is thereafter further condensed by reacting it with the remainder of the formaldehyde and the alkylene polyamine thereafter added to the precursor condensate.

This aspect of the invention is illustrated in the following examples, but is not limited thereto.

EXAMPLE A

In a three-necked reaction flask provided with means of mechanical stirring and a return condenser system permitting the removal of any aqueous phase formed in the course of the reaction, there is added 750 parts of a crude alkylate phenol which comprises an undistilled p-nonylphenol containing approximately 10% of o,p-dinonyl phenol, 100 parts paraformaldehyde and 2 parts of finely divided sodium hydroxide which is present as a catalyst in the reaction. These materials are heated to 60° C., and at this point the source of heat is removed. The temperature rises slowly to approximately 110° C., at which point it is held for two hours. At this point 250 parts of a suitable hydrocarbon extract is added, and heat is applied to remove 36 parts of aqueous distillate at a maximum temperature of 150° C. The reaction mass is cooled to 130° C., and at this point is added 100 parts of a crude mixture of polyethylene polyamines, approximately 10% of which is triethylenetetramine, 40% tetraethylenepentamine and the remainder homologs higher than tetraethylene pentamine. Heat is again applied to remove 22 parts of aqueous distillate with a maximum final temperature of 220° C. At this point the material is cooled to 150° C., and 250 parts of a suitable hydrocarbon extract is added to give the finished phenol-formaldehyde-alkylene polyamine resin.

EXAMPLE B

In a manner similar to Example A, 750 parts of the same crude alkylate phenol, 110 parts paraformaldehyde and 2 parts sodium hydroxide were heated for 2 hours at temperatures in the range of 100–110° C. After this period of heating, 250 parts of a suitable hydrocarbon extract were added, and 36 parts of aqueous distillate were removed with a maximum final temperature of 135° C. The reaction mass was then cooled to 90° C., and 50 parts of diethylenetriamine were added. The material was again heated to remove an additional 32 parts of aqueous distillate with a maximum final tempearture of 210° C. The material was cooled to 150° C., and 250 parts of a suitable hydrocarbon extract were added to give the finished resin.

EXAMPLE C

In a manner similar to Example A, 750 parts of the same crude alkylate phenol, 120 parts of paraformaldehyde and 2 parts sodium hydroxide were reacted for a period of 2 hours at temperatures between 100–110° C. After this period of heating, 250 parts of a suitable hydrocarbon extract were added and the temperature raised to remove 36 parts of aqueous distillate with a maximum temperature of 136° C. The material was cooled to 100° C., and at this point 60 parts of the crude mixture of higher polyethylene polyamines, as described in Example A, were added. The reaction mass was again further heated to remove an additional 36½ parts of aqueous distillate with a maximum final temperature of 212° C. The material was then cooled to 150° C., and 250 parts of a suitable hydrocarbon extract were added to give the finished resin.

EXAMPLE D

In a manner similar to Example A, 3750 parts of crude alkylate phenol, 700 parts paraformaldehyde and 20 parts sodium hydroxide were reacted at temperatures between 100–110° C. for a period of 2 hours. At the end of this period of heating 2000 parts of a suitable hydrocarbon extract were added, and the temperature was raised to remove 200 parts of aqueous distillate with a maximum final temperature of 116° C. At this point, 1000 parts of a suitable hydrocarbon extract, and 350 parts diethylene triamine were added. The temperature is again raised to remove 255 parts aqueous distillate with a maximum final temperature of 210° C. This gives the finished resin.

EXAMPLE E

In a three-necked reaction flask provided with means of mechanical stirring and a return condenser system permitting the removal of any aqueous phase formed in the course of reaction, there is added 500 parts of the crude alkylate phenol, as described in Intermediate Example A, and 70 parts of diethylenetriamine. These materials are heated together to approximately 60° C. at which point the addition of paraformaldehyde is begun. Then 108 parts paraformaldehyde are added slowly and in portions in such a manner to maintain the temperature of the reaction mass below 90° C. After the addition of the paraformaldehyde has been completed, 200 parts of a suitable hydrocarbon extract are added and the temperature raised to remove aqueous distillate in the amount of 55 parts with a maximum final temperature of 200° C. This gives the finished phenol-formaldehyde-alkylene polyamine resin.

The ratio of amine to phenol in the above example is calculated to give about one basic nitrogen per mole of phenol. It should be further noted in this example that the amine operates as a reactive catalyst, or in other words, no sodium hydroxide or other alkaline material is used as a catalyst.

EXAMPLE F

In a manner similar to Example E, 500 parts of the crude alkylate phenol and 103 parts of diethylenetriamine are reacted with 120 parts of paraformaldehyde. After the addition of the paraformaldehyde is completed, 200 parts of a suitable hydrocarbon extract are added and the temperature raised to remove 69 parts of aqueous distillate with a maximum final temperature of 176° C. This gives the finished resin.

In the above example it might be noted that the ratio of amine to phenol provides about one primary amino group per mole of phenol. Also, as in Example E, the amine functions as a reactive catalyst.

The alkylene polyamine serves as a linking radical in the polymer chain, connected at two amino nitrogens by a methylene group, supplied by the formaldehyde to the phenolic nuclei and possibly partly to other alkylene polyamine groups. With alkylene polyamines containing two terminal primary amino groups, such as those heretofore named, the reaction with formaldehyde in all probability is at the terminal primary amino groups.

The ratio of the phenol to the alkylene polyamine in the polymer condensate ranges from about 1:1 to about 10:1, respectively, and the molar quantity of the reacted aldehyde is in the range of about 0.9 to about 1.5 times the total reacted mols of the phenol and the alkylene polyamine. With polyamines containing only 2, 3, or 4 amino groups, the mol ratio of phenol to polyamine preferably ranges from about 1:1 to 4:1, respectively. At least some phenol and polyamine residues in all of the various types of condensates will be linked by the characteristic group.

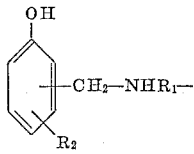

wherein $R_2$ is the alkyl group in the o- or p-position, the methylene bridge is in the o- or p-position, and $R_1$ is the remainder of the polyamine residue. Some of the polymeric condensates will have at least one of the following linking groups.

(a)
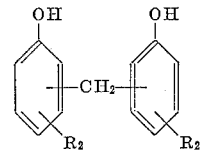

(b) 

wherein the methylene bridge in (a) and $R_1$ and $R_2$ are as above described. In all of the condensates, at least a portion of the alkylene polyamine residues are chemically combined internally in the structure of the phenol-formaldehyde-alkylene polyamine resins.

Oxyalkylation of the condensation products

Having prepared the intermediate phenol-formaldehyde-polyamine condensation products, the next step is the oxyalkylation of the condensation product. This is achieved by mixing the intermediate phenol-formaldehyde-polyamine condensation product in a hydrocarbon solvent with a small amount of sodium or potassium hydroxide in an autoclave. The condensation product is heated above 100° C., and preferably not over 180° C., and the alkylene oxide is charged into the autoclave until the pressure is in the vicinity of 75 to 100 p.s.i.

The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde-polyamine condensation product, in which the weight ratio of the oxide to the condensation product is between about 2:3 and 10:1, respectively, or even slightly higher.

Some preferred embodiments of the oxyalkylated, alkyl phenol-formaldehyde-polyamine condensation products and methods of their preparation are illustrated in the following examples wherein all parts are by weight unless otherwise stated, but the invention is not limited thereto.

EXAMPLE I

In an autoclave having a nominal capacity of 5 gallons, equipped with a means of external heating, cooling and mechanical agitation, there is charged 22 parts of the resin of Example D. Into a transfer bomb there is charged 25 parts ethylene oxide. The reactants are heated to 145° C., and the ethylene oxide is added until the reactor pressure is 30 p.s.i. The reaction mixture is gradually heated until an exothermic reaction begins to take place. The external heating is then removed, and ethylene oxide is added at such a rate that the temperature is maintained between 150–160° C. with a pressure range of 80 to 100 p.s.i. After approximately two hours, 22 parts of ethylene oxide has been added to the autoclave, and the temperature is maintained for an additional 30 minutes to make sure that the unreacted oxide is reduced to a minimum. The resulting product is the ethylene oxide adduct of a phenol-formaldehyde-alkylene polyamine resin in which the ratio of oxide to resin by weight is about 1 to 1.

EXAMPLE II

In a manner similar to Example I, a mixed oxide adduct of the resin of Example D was prepared in which the ratio of ethylene oxide to propylene oxide was 1 to 1. The finished product is a material in which the ratio of mixed oxides to resin is 6 to 1.

EXAMPLE III

In a manner similar to Example I, a mixed oxide adduct of the resin of Example D was prepared in which the ratio of ethylene oxide to propylene oxide is 1 to 2. The finished product contains a ratio of 6 parts of mixed oxides to 1 part of resin.

EXAMPLE IV

In a manner similar to Example I, 4 pounds of the resin of Example D and 1 part of sodium hydroxide are charged into a 5 gallon autoclave. These materials are heated to 145° C., and 36 pounds of propylene oxide are added over a period of approximately 8 hours at temperatures in the range of 145–150° C. and pressures in the range of 60–80 p.s.i. After the addition of the propylene oxide was completed, the material was further heated for a period of 2 hours so that residual propylene oxide is reduced to a minimum. The finished product is a propylene oxide adduct of the phenol-formaldehyde-polyamine resin in which the ratio of propylene oxide to resin is 9 to 1.

EXAMPLE V

In a manner similar to Example I, 8 pounds of the finished product of Example IV are charged into a 5 gallon autoclave. At temperatures between 150–160° C., 2 pounds of ethylene oxide are added, and the material is further heated for a period of 30 minutes to allow the reactor pressure to drop to a constant value. The finished product is a sequential propylene oxide-ethylene oxide adduct of a phenol-formaldehyde-polyamine resin in which the ethylene oxide content is 20% by weight.

EXAMPLE VI

In an autoclave having a 2-liter capacity, equipped with a means of external heating, internal cooling coils and mechanical agitation, there is charged 400 parts of the resin of Example B and 1 part sodium hydroxide. Into a transfer bomb there is introduced 605 parts ethylene oxide. The resin intermediate is heated to 140° C., and ethylene oxide is charged into the reactor until reactor pressure is 80 p.s.i. The reaction mixture is gradually heated until an exothermic reaction begins to take place. The external heating is then removed, and ethylene oxide is added at such a rate that the temperature is maintained between 150–160° C. with a pressure range of 80–100 p.s.i. After approximately 3 hours all of the oxide has been added to the autoclave, and temperature is maintained for an additional 30 minutes to make certain that the unreacted oxide is reduced to a minimum. The resulting product is the ethylene oxide adduct of a phenol-formaldehyde-polyamine resin in which the ratio of oxide to resin is 3 to 2 by weight.

EXAMPLE VII

In a manner similar to Example VI, 504 parts of the resin of Example A and 515 parts of ethylene oxide are reacted. The finished product is the ethylene oxide adduct of a phenol-formaldehyde-polyamine resin in which the ratio of oxide to resin is 1 to 1 by weight.

EXAMPLE VIII

In a manner similar to Example VI, 600 parts of the resin of Example E was reacted with 400 parts of ethylene oxide which gives a finished product in which the ratio of oxide to resin is 2 to 3 by weight. The oxyalkylation catalyst used in this preparation was potassium hydroxide.

EXAMPLE IX

In an autoclave having a two-liter capacity, equipped with a means of external heating, internal cooling coils and mechanical agitation, there is charged 400 parts of the resin of Example E and 2 parts sodium hydroxide. Into a transfer bomb there is introduced 300 parts of ethylene oxide and 900 parts propylene oxide. The resin is heated to 145° C., and the mixed oxides are charged into the reactor until reactor pressure is 60 p.s.i. The reaction mixture is gradually heated until an exothermic reaction begins to take place. The external heating is then removed, and the mixed oxides are added at such a rate that the temperature is maintained between 145–150° C. with a pressure range of 80–100 p.s.i. After approximately 4 hours all of the oxide has been added to the autoclave, and the temperature is maintained for an additional 2 hours to make certain that the unreacted oxide is reduced to a minimum. The resulting product is the mixed oxide adduct of a phenol-formaldehyde-polyamine resin in which the ratio of mixed oxides to resin is 3 to 1 by weight.

EXAMPLE X

In an autoclave having a two-liter capacity, equipped with means of external heating, internal cooling coils and mechanical agitation, there is charged 700 parts of the resin of Example F and 2 parts potassium hydroxide. Into a transfer bomb there is introduced 700 parts propylene oxide. The intermediate is heated to 135° C., and the propylene oxide is charged into the reactor until reactor pressure is 50 p.s.i. The reaction mixture is gradually heated until an exothermic reaction begins to take place. The external heating is then removed, and propylene oxide is then added at such a rate that the temperature is maintained between 135–145° C. with a pressure range of 60–80 p.s.i. After approximately 6 hours all of the propylene oxide has been added to the autoclave, and the temperature is maintained for an additional 2 hours to make certain that the unreacted propylene oxide is reduced to a minimum. The resulting product is the propylene oxide adduct of a phenol-formaldehyde-polyamine resin in which the ratio of oxide to resin is 1 to 1 by weight.

EXAMPLE XI

Four hundred fifty parts of the finished product of Example X is charged into a two-liter autoclave, and 50 parts ethylene oxide are added at temperatures between 150–160° C. After the oxide has been added the autoclave is further heated until a constant pressure value is observed. The resulting product is a sequential propylene oxide-ethylene oxide adduct of a phenol-formaldehyde-polyamine resin in which there is 10% of ethylene oxide by weight.

EXAMPLE XII

In a manner similar to Example I, an ethylene oxide adduct of a resin of Example C was prepared in which the ratio of oxide to resin is 2 to 3 by weight.

The oxyalkylated phenol-formaldehyde-alkylene polyamine resins of the foregoing examples are made into finished products suitable for use as emulsion-breaking chemicals by blending the resins with about an equal amount by weight of a suitable hydrocarbon vehicle.

Among the suitable hydrocarbon vehicles which can be employed as diluents is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains and is designated in the trade as sulfur dioxide extract of $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting means and has a boiling point or boiling range in excess of the boiling point of water.

*Deemulsification of water-in-oil emulsions*

The compositions of this invention are surface-active and are particularly suitable for the deemulsification of naturally-occurring crude oil emulsions and emulsions resulting from the afore-described desalting processes. Deemulsification is achieved by mixing the deemulsifying agents of this invention, at a ratio in the approximate range of one part of the deemulsifying agent to 2,000–50,000 parts of the emulsion, and thereafter allowing the emulsion to remain in a relatively quiescent state during which separation of the oil and water occurs. With naturally-occurring emulsions, the temperature of the emulsion may be 50–210° F., although temperatures of at least 120° F. are often preferred to accelerate separation of the deemulsified water and oil phases. The deemulsifying agents of this invention may be used in conjunction with other deemulsifying agents from classes such as the petroleum sulfonate type, of which naphthalene sulfonic acid is an example, the modified fatty acid type, and others.

The effectiveness of the compositions of this invention as deemulsifying agents is illustrated in the following tests and data.

*Bottle testing of crude oil emulsions*

The bottle testing of crude oil emulsions is conducted according to the following procedure: Fresh samples of the emulsion-breaking chemicals in organic solvent solution are prepared in 10% solutions. These solutions are made by accurately diluting 10 milliliters of the emulsion-breaking chemicals in 90 milliliters of a mixture of equal parts of anhydros isopropyl alcohol and an aromatic hydrocarbon such as xylene. The mixture is agitated well until the emulsion-breaking chemical is completely dissolved.

The equipment for running the crude oil emulsion-breaking test, in addition to the foregoing 10% solutions, includes a set of six ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the thumb over the opening of each bottle so that the bottle will be coated with an emulsion film.

By means of the 0.2 milliliter pipette, the prescribed volume of the 10% solution of the emulsion-breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings on remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F. the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150° F. without shaking or disturbing the settled B.S. layer. The heated sample is then centrifuged for 15 seconds. This should give a true B.S. reading free of paraffin.

An excess chemical grind-out is then run on each centrifuge tube by adding several drops of a 20% solution in white gasoline or other solvent of a chemical which causes complete separation of the water and oil. With some sensitive emulsions the chemical will cause reemulsification. In these instances it is necessary to rethief and add a lesser amount. Each tube is vigorously shaken to make sure that the packed B.S. layer is broken up and the tubes heated to 150° F. in the case of troublesome paraffin base crude oil. The samples are then centrifuged for three minutes.

During the test the speed of the water drop is observed carefully after the emulsion-breaking chemical is added to the prescription bottles. The observation of the color and brilliance of the oil in transmitted light is very important. In general, the brilliance and depth of color increases with a decrease in B.S. & W. (bottom settlings and water) content. The observations of color are made in the oil in the prescription bottle before and after heat treatment. In the ideal treatment of crude oil emulsions the oil-water line could be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion-breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

By way of illustrating the effectiveness of the emulsion-breaking chemicals contemplated by this invention, the composition of Example VI and a composition similar to that of Example VI but having a ratio of ethylene oxide to resin of 1:1, identified in the following table as Composition A and Composition B, respectively, were tested as solutions of between 4 and 5 percent of active ingredient according to the foregoing bottle-testing procedure on samples of 27 gravity crude oil obtained from South Mountain Field, California. The crude oil emulsion contained about eight percent water. The solutions were added at a ratio of 0.08 part of a 10% solution, as described in the foregoing procedure, to 100 parts of emulsion fluid. The samples were given 200 shakes cold and 100 shakes hot, the hot temperature being 180° F. The observations made during the tests were recorded and are summarized in the following table.

TABLE I

| Treating Chemical | Water Drop | | Thief Grind-Out | | Excess Grind-Out | |
| --- | --- | --- | --- | --- | --- | --- |
| | 105 min.[1] | 14 hr.[2] | B.S. | Water | B.S. | Water |
| Composition A | 2 | 6 | 1.2 | 0 | 0 | 1.0 |
| Composition B | 2 | 8 | 0.1 | 0.2 | 0 | 0.2 |

[1] Before hot agitation.
[2] After hot agitation.

The composition of Example VII has been found to be effective in desalting operations.

It is to be noted that in the deemulsifying agents of this invention wherein ethylene oxide is employed as the oxyalkylating agent, the weight ratio of ethylene oxide to resin is at the lower end of the range heretofore described and preferably does not exceed a ratio of about 2:1. At higher ratios, these compounds are too hydrophilic to be used as emulsion-breaking chemicals.

The invention is hereby claimed as follows:

1. An oxyalkylated alkyl phenol-formaldehyde-alkylene polyamine resin produced by heating a mixture of (A) an alkyl phenol selected from the group consisting of an ortho and para monoalkyl phenol having a 4–15 carbon alkyl group, mixtures of said monoalkyl phenols, and mixtures of said monoalkyl phenol with up to 25% of o, p-dialkyl phenols with 4–15 carbons in the alkyl groups; (B) formaldehyde and (C) alkylene polyamine having two primary amino groups and alkylene groups of 2–6 carbons in a mole ratio of (A) to (C) of about 1:1 to 10:1, respectively, and a mol ratio of (B) to the total mols of (A) and (C) of about 0.9:1 to 1.5:1, respectively, removing by distillation during said heating water of reaction of the polycondensation reaction to produce an alkyl phenol-formaldehyde-alkylene polyamine resin characterized by alkylene polyamine units connected in the polycondensate chain by methylene groups on two amino nitrogens; and oxyalkylating said resin with alkylene oxide selected from the group consisting of ethylene oxide, 1,2-propylene oxide and both ethylene oxide and 1,2-propylene oxide in an amount of the latter sufficient to provide in the oxyalkylated alkyl phenol-formaldehyde-alkylene polyamine resin a weight ratio of oxyalkylene groups to said alkyl phenol-formaldehyde-alkylene polyamine resin in the range of about 2:3 to 10:1, respectively.

2. An oxyalkylated alkyl phenol-formaldehyde-alkylene polyamine resin produced by first heating a mixture of formaldehyde and an alkyl phenol selected from the group consisting of an ortho and para monoalkyl phenol having a 4–15 carbon alkyl group, mixtures of said monoalkyl phenols, and mixtures of said monoalkyl phenol with up to 25% of o, p-dialkyl phenols with 4–15 carbons in the alkyl groups to produce a precursor alkyl phenol-formaldehyde intermediate condensate, further condensing said intermediate condensate by heating it with additional alkyl phenol as aforedefined and formaldehyde and also alkylene polyamine having two primary amino groups and alkylene groups of 2–6 carbons, the total amounts of said alkyl phenol used in both of the aforesaid reactions to said alkylene polyamine used in the latter reaction being about 1:1 to 10:1, respectively, and the total mols of formaldehyde used in both of the aforesaid reactions to the total mols of both of said alkyl phenol used in both of the aforesaid reactions and the alkylene polyamine used in the latter reaction being about 0.9:1 to 1.5:1, respectively, and removing by distillation during said heating in both of the aforesaid reactions the water of reaction to produce alkyl phenol-formaldehyde-alkylene polyamine resin characterized by alkylene polyamine units connected in the polycondensate chain by methylene groups on two amino nitrogens; and oxyalkylating said resin with alkylene oxide selected from the group consisting of ethylene oxide, 1,2-propylene oxide and both ethylene oxide and 1,2-propylene oxide in an amount of the latter sufficient to provide in the oxyalkylated alkyl phenol-formaldehyde-alkylene polyamine resin a weight ratio of oxyalkylene groups to said alkyl phenol-formaldehyde-alkylene polyamine resin in the range of about 2:3 to 10:1, respectively.

3. A polyoxyalkylated resin as claimed in claim 1 wherein the alkylene oxide employed for said polyoxyalkylation consists of ethylene oxide, and the weight ratio of oxyethylene groups to said alkyl phenol-formaldehyde-alkylene polyamine resin being in the range of about 2:3 to 2:1.

4. A polyoxyalkylated resin as claimed in claim 1 wherein the alkylene oxide employed for said polyoxyalkylation consists of 1,2-propylene oxide.

5. A polyoxyalkylated resin as claimed in claim 2 wherein the alkylene oxide employed for said polyoxyalkylation consists of ethylene oxide, and the weight ratio of oxyethylene groups to said alkyl phenol-formaldehyde-alkylene polyamine resin being in the range of about 2:3 to 2:1.

6. A polyoxyalkylated resin as claimed in claim 2 wherein the alkylene oxide employed for said polyoxyalkylation consists of 1,2-propylene oxide.

7. A polyoxyalkylated resin as claimed in claim 1 wherein the alkylene oxide employed for said polyoxyalkylation consists of both ethylene oxide and 1,2-propylene oxide.

8. A polyoxyalkylated resin as claimed in claim 2 wherein the alkylene oxide employed for said polyoxyalkylation consists of both ethylene oxide and 1,2-propylene oxide.

References Cited by the Examiner

UNITED STATES PATENTS

| | | | |
|---|---|---|---|
| 2,839,502 | 6/1958 | De Groote | 260—58 |
| 2,854,433 | 9/1958 | De Groote | 260—51.5 |

FOREIGN PATENTS

| | | |
|---|---|---|
| 579,342 | 9/1959 | Belgium. |
| 886,766 | 1/1962 | Great Britain. |

SAMUEL H. BLECH, *Primary Examiner.*

WILLIAM H. SHORT, *Examiner.*

H. E. SCHAIN, *Assistant Examiner.*